Figure 1:
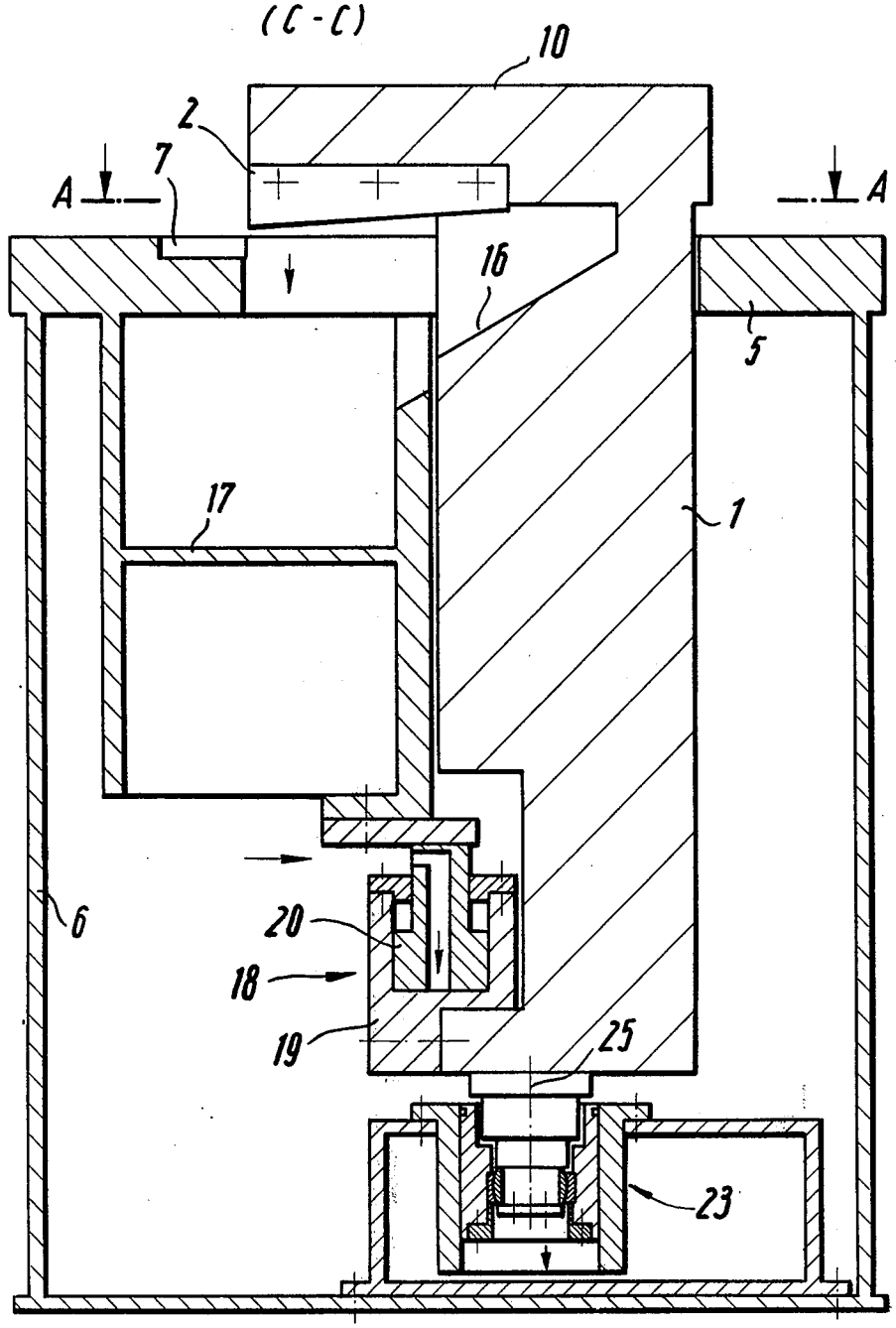

United States Patent [19]

Fazis

[11] 4,129,054
[45] Dec. 12, 1978

[54] PUNCHING PRESS

[75] Inventor: Harald Fazis, Lörrach, Germany

[73] Assignee: Ludwig Boschert, Maschinen- und Apparatebau GmbH & Co. KG, Germany

[21] Appl. No.: 757,200

[22] Filed: Jan. 6, 1977

[30] Foreign Application Priority Data

Jan. 20, 1976 [DE] Fed. Rep. of Germany ....... 2601858

[51] Int. Cl.² ...................... B21D 28/02; B21D 37/12
[52] U.S. Cl. .......................... 83/165; 83/620; 83/635; 83/637; 83/693; 83/917
[58] Field of Search .................. 83/917, 692, 693, 395, 83/394, 635, 637, 859, 620, 622, 165

[56] References Cited

U.S. PATENT DOCUMENTS

| 1,351,115 | 8/1920 | Morse | 83/693 X |
| 2,656,888 | 10/1953 | Cruzan | 83/620 X |
| 3,065,657 | 11/1962 | Thompson | 83/917 X |
| 3,277,763 | 10/1966 | Haug | 83/917 X |
| 3,496,822 | 2/1970 | Nuckols et al. | 83/637 |
| 3,521,515 | 7/1970 | Aramini | 83/620 |
| 3,850,067 | 11/1974 | Davey | 83/693 X |

Primary Examiner—J. M. Meister
Attorney, Agent, or Firm—Frailey & Ratner

[57] ABSTRACT

Punching press having a top cutter which is vertically movable by an axially guided ram. The top cutter extends beyond the cross-sectional surface area of the ram and cooperates with a bottom cutter mounted on the machine table. The ram is constructed as an angle section, particularly as an equal-limbed L-section, at least on the place of mounting for the top cutter and at least over an axial length corresponding to the length of stroke of the top cutter. The axial guiding system for the ram comprising a pin-and-bush guide which is disposed on the cutting clearance and comprising at least two pins and associated guide bushes situated at a distance from each other on the ram and on the machine frame in an axially parallel configuration.

8 Claims, 5 Drawing Figures (B-B)

PUNCHING PRESS

The invention relates to a punching press, more particularly a coping press, with a top cutter moved vertically by an axially guide ram and extending beyond the cross-sectional surface area of said ram, and with a bottom cutter which is attached to the machine table.

The top cutter of punching presses of the kind described hereinbefore and disclosed in the U.S. Pat. No. 3,850,067 is mounted on a cantilevered arm of the ram which is arranged laterally of the shearing clearance between the two cutters. The length of the cantilevered arm therefore defines the shortest distance between the cutting clearance and the closed external surface of the ram and thus also defines the maximum attainable punching depth. Greater punching depths of these known machines therefore call for a correspondingly increased cantilevered length of the arm which retains the top cutter so that at least the ram but as a rule the entire machine must be constructed in heavier form if an equally clean cut is to be obtained in view of the correspondingly increased lever transmission ratio between the ram axis and the place at which the cutting forces act. A punching press of this kind, which must be constructed to a correspondingly large size, must be regarded as overdimensioned if it can achieve greater punching depths but is required to process lighter sheet metal gauges which call for correspondingly lower cutting forces. In these cases it is therefore common practice at the present time to use smaller machines but in which the workpiece is repeatedly processed. For example, in the production of sheet metal containers produced from rectangular blanks, the four corners of which must be correspondingly notched, the finished diagonal dimension must be initially cut at each corner in a first operation as indicated in the left-hand part of FIG. 5 by the diagonal cut edges a. In a further operation the diagonal cut edges a are then notched to the finished depth dimension to provide the corresponding cut edges b and c. Compared with a single operation this results in twice the operating costs and duplicated processing also calls for greater skill to ensure that both cuts performed on each corner of the sheet metal blank actually provide the desired finished dimension.

According to an earlier proposal the ram of a comparable punching press is constructed as a tubular member, preferably of circular cross-section, and the cutting clearance of the two cutters is then disposed within the internal diameter of such ram. Furthermore, to provide axial guiding for the ram the bottom end thereof is provided with a pin-and-bush guide system comprising at least two diametrically arranged pins and associated guide bushes on the ram or on the machine frame respectively as well as a top support bearing which supports the top ram end near the bottom cutter on the machine frame in a concentric configuration.

The object of the invention is to provide a punching press, more particularly a punching press which can be used as a coping press capable more particularly of performing corner notching in one operation and generally permitting a greater punching or notching depth for workpieces with a curved or polygonal edge and having a construction of lighter weight.

In a punching press of the initially mentioned kind this problem is solved in that the ram is constructed as an angle section, more particularly as an equal-limbed L-section, at least at the place of attachment for the top cutter and at least over an axial length corresponding to the length of stroke of said cutter.

With this construction of the ram according to the invention the distance between the cutting clearance and the external surface region of the ram required as a stop abutment for the sheet metal to be machined defines the punching depth and is increased but avoiding a like increase in the distance between the cutting clearance and the ram axis as was necessary in known punching presses if an increase of the punching depth was to be obtained. Since such a greater punching depth can be achieved without a corresponding increase of the distance between the cutting clearance and the ram axis it is possible for the ram to retain its less massiive construction so that no special problems regarding axial ram guiding and supporting of the ram on the machine casing occur even with such greater punching depth.

As regards axial ram guiding and the support of the ram on the machine frame the invention permits the adoption of a simpler embodiment because smaller forces are transmitted to the ram axis under comparable conditions. In terms of achieving optimum cutting quality the invention also provides that the ram is axially guided by pin-and-bush guiding means, preferably situated directly adjacent to the cutting clearance or in the transverse plane which accommodates the cutting clearance and comprising at least two pins disposed on the ram and on the machine frame and associated guide bushes. Doubling of the pins and guide bushes is advantageous since in addition to providing precise axial guiding for the ram it also at least substantially prevents the creation of a torque with respect to the ram axis, particularly if the pin guide is situated on the ram axis side which is distal from the cutting clearance. As regards the attainable cutting quality this can be improved still further by means of such a pin-and-bush guide in accordance with a particularly advantageous embodiment of the invention in which each pin is coupled to the associated guide bush through a ball socket joint comprising a joint ball disposed on the pin end and a ball socket which is axially slidable in the guide bush and is arranged concentrically therewith. Such ball sockets ensure that even large lateral forces which act on the pin-and-bush guide have no detrimental effect on the guiding accuracy, an effect which could occur by directly guiding the pins on the associated guide bush due to the pin axis being aligned at an angle to the axis of the guide bush so as to lead to greater edge pressure and therefore to an increase of the clearance between the pin and the guide bush so that axial guiding of the ram becomes progressively less accurate when allowing for wear in the course of time. Inaccurate ram guiding however finally enables the top cutter to deflect at the moment of the cutting operation so that a corresponding reduction of the cutting quality must be expected. However, in the presence of such ball socket joints any angular position of the pins mounted on the ram will have no detrimental effect on the entire axial guiding of the ram because it results merely in a specific displacement of the press force which acts on the associated ball socket without resulting in a change in the manner in which this is guided on the surrounding guide bush of the pin-and-bush guiding system.

Figure 2:
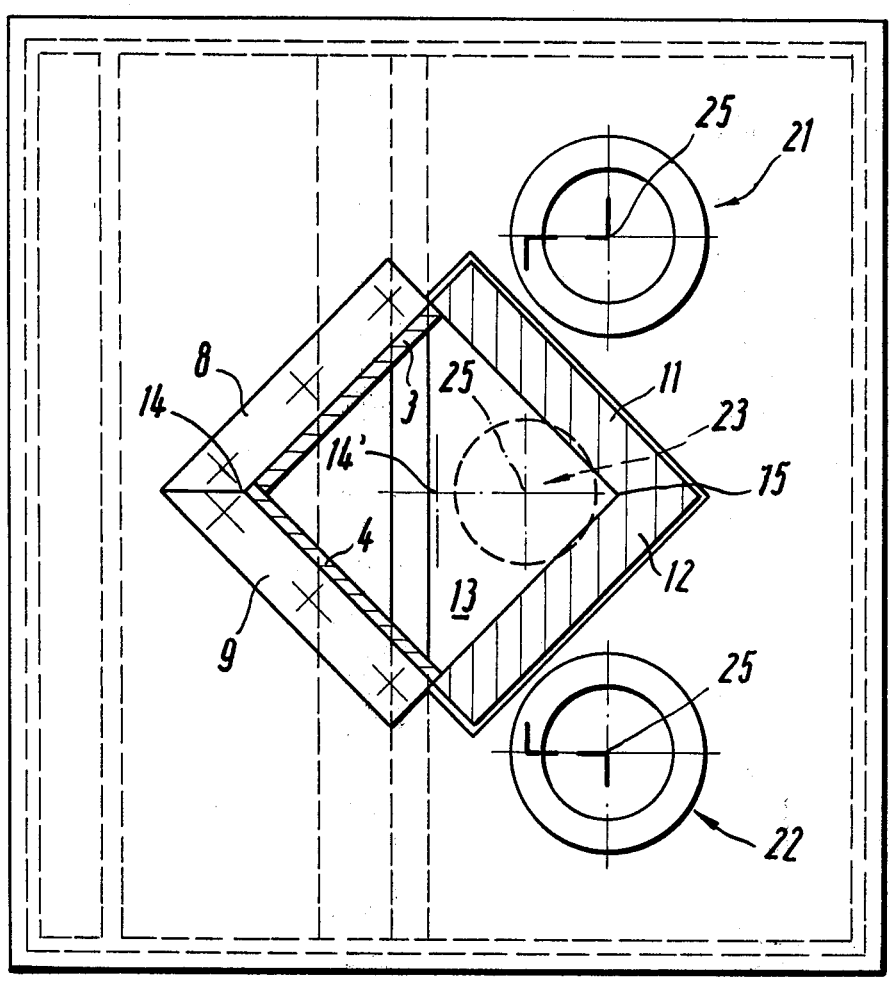
Figure 3:
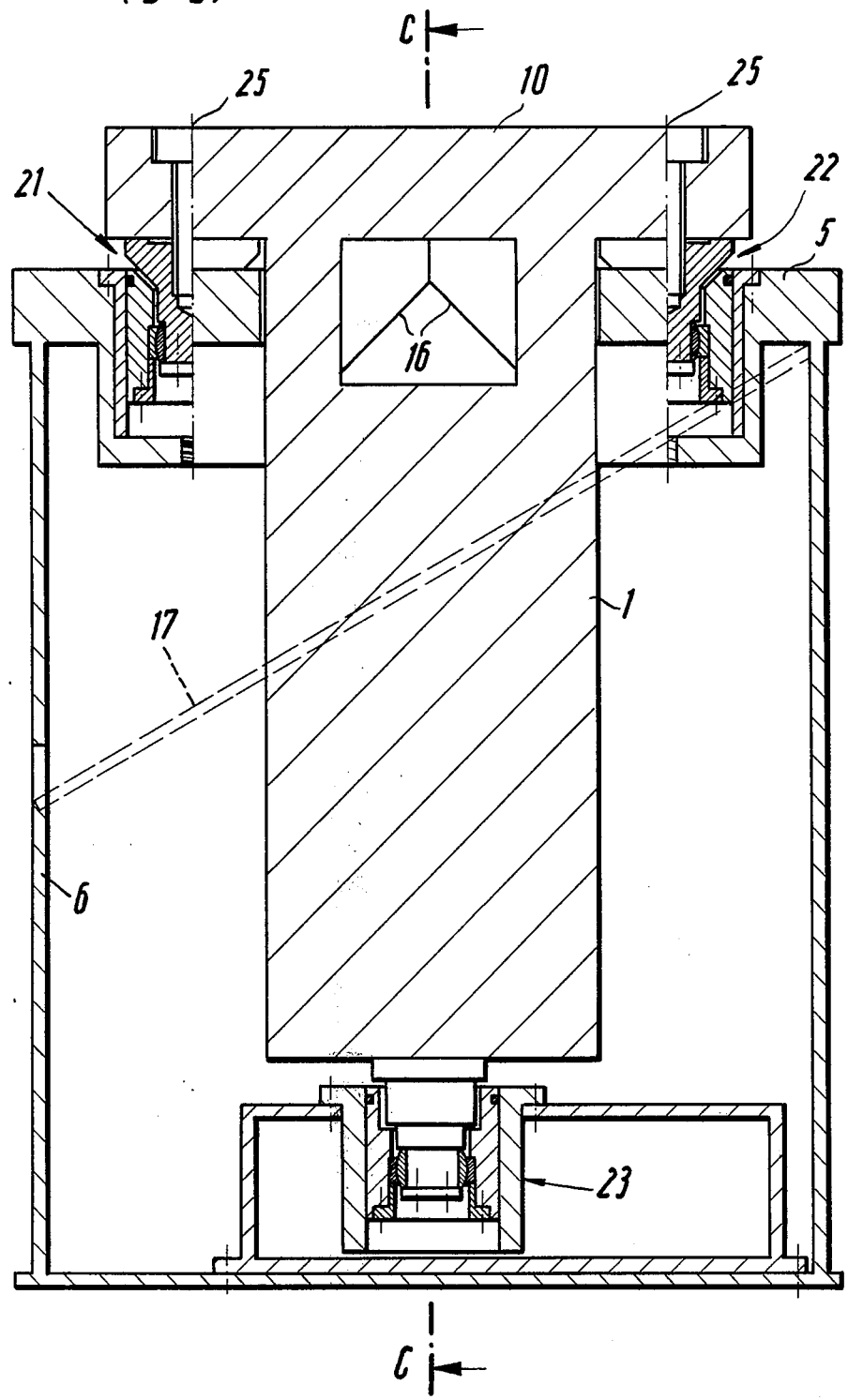
Figure 4:
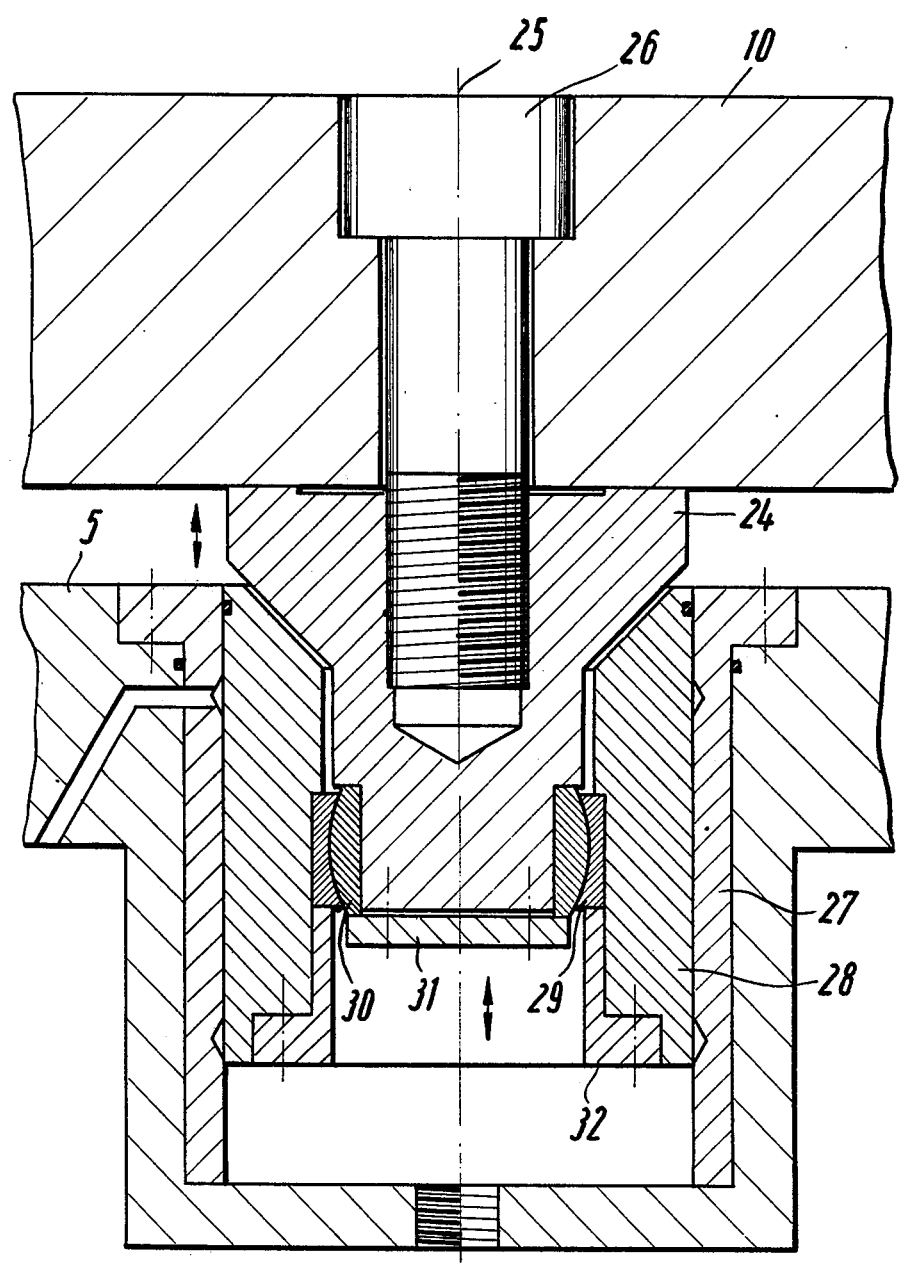

One embodiment of the invention is described hereinbelow by reference to the accompanying drawing, in which:

FIG. 1 is a longitudinal section through the machine in a view in which the cutting clearance is situated on the left of the ram axis, showing a sectional view along the line C—C of FIG. 3, FIG. 2 is a cross-section along the line A—A of FIG. 1, FIG. 3 is a longitudinal section according to FIG. 1 along the line B—B of FIG. 2 and FIG. 4 shows to an enlarged scale the pin-and-bush guide system embodied on this machine with a ball socket joint shown as an axial sectional view.

Figure 5:
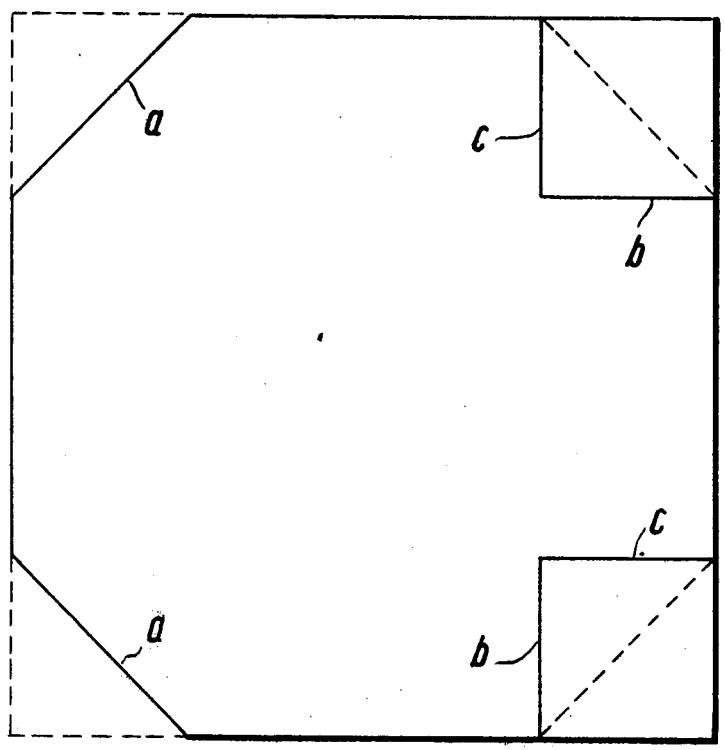

FIG. 5 shows a blank which has been cut by the machine.

The illustrated punching press is constructed as a coping press due to the top cutter 2, attached to the top end of a vertically movable ram 1, comprising two individual cutters 3 and 4 arranged at right angles to each other to provide a corresponding rectangularly constructed cutting clearance in conjunction with a bottom cutter 7 attached to the machine table 5 of the machine frame, the entirety of which is designated with the numeral 6. The bottom cutter 7 also comprises two individual cutters 8 and 9 which are individually screw-mounted to the machine table 5 so that they can be simply exchanged.

The ram 1 is constructed over its entire axial length as an equal-limbed L-section the top end of which is provided with a mounting plate 10 for the top cutter 2. Said mounting plate 10 can be integral with the angle section or it can be a separate component which is welded to the angle section or is otherwise rigidly connected thereto so that the top cutter 2 is firmly held on the ram 1. As can be seen more particularly by reference to the cross-section according to FIG. 2, the top cutter 2, which is attached to the ram 1, projects beyond the cross-sectional surface area of the angle section in a configuration which is such that the internal cross-sectional edges of the two equally long limbs 11 and 12 and the cutter edges, which produce the cutting clearance and are associated with the two individual cutters 3 and 4 of the top cutter provide a square contour. The transverse plane, in which the top cutter 2 is situated and which is associated with the ram 1, therefore forms a block-shaped cavity 13 which is defined on the one hand by the vertical internal surfaces of the two limbs 11 and 12 and on the other hand by the vertical internal surfaces of the two individual cutters 3 and 4 of the top cutter and whose axis 14' practically coincides with the axis of the centre of gravity of the two cutters 2 and 7 with which the accuracy of axial guiding of the ram 1 is to be aligned. The axial length of the cavity 13 must be at least equal to the length of stroke of the top cutter 2 so that the full notching depth can be utilized when notching sheet metal in one operation, the said full notching depth being defined in FIG. 2 by the distance between the corner points 14 and 15. To retain the said longer notching depth the points 14 and 15 the ram 1 need only be constructed as an angle section at the place of attachment for the top cutter 2 and only at least over the axial length corresponding to the length of stroke of said cutter and the remaining length of the ram can be constructed in any desired manner, for example in solid form if this should result in particular advantages for guidance or advantages for a specific kind of drive for the ram.

As regards the top position of the ram 1 a collector plate 16 for punching waste is inserted between the two limbs 11 and 12 of the angle section beneath the transverse plane in which the cutting clearance is accommodated so that the punching waste can be deflected to a guide plate 17, arranged at an angle, and from there to a container (not shown) which is situated adjacent to the machine. The drive for the ram 1 is designated in its entirety with the numeral 18 and is situated in the axis of the centre of gravity 14' of the two punching cutters 2 and 7, said drive comprising a hydraulic cylinder 19 mounted on the ram and a piston 20 which is mounted on the machine frame. The piston 20 is provided with an axial port, aligned with the axis of the centre of gravity 14', for the delivery of hydraulic fluid against the floor of the cylinder 19 to enable the working stroke of the ram to be performed. Restoring springs, not shown, are provided for the return stroke of the ram. A triple pin-and-bush guide system is provided for axial guiding of the ram 1 and forms a kind of three-point support for the ram on the two top positions 21 and 22 near the cutting clearance and on the place 23 which acts on the bottom ram end. Since the pin-and-bush guiding system is identically constructed at these three places, the description hereinbelow can be confined to the pin-and-bush guidance system situated at the place 22 and illustrated in FIG. 4.

The pin-and-bush guidance system 22 comprises a pin 24, which is flanged on the ram 1 or on its mounting plate 10 for the top cutter 2 and is pulled tight against the ram by a screw-fastener 26 which is disposed in the pin axis 25. A guide bush 27 is bolted on the machine frame 6 coaxially with the pin 24 and a further bush 28 is axially slidable in said guide bush 27. The ball socket 29 of a ball socket joint is attached to the bush 28 which is therefore also coaxial with the pin axis 25 and the joint ball 30, which is associated with the ball socket joint, is slid on the free end of the guide pin 24 and is retained on said pin by means of a mounting plate 31. The ball socket 29 on the other hand is retained on an internal stop abutment of the bush 28 by means of a sleeve 32 which is inserted into the mounting bush 28.

As can be seen more particularly by reference to the sectional view according to FIG. 2, all three pin guides 21, 22 and 23 are situated on the side of the centre of gravity axis 14' which is distal from the cutting clearance. The two top pin guides 21 and 22 are arranged on different sides of the vertical plane which accommodates the said centre of gravity axis 14' and the measured distance defining the punching depth between points 14 and 15, the bottom pin-and-bush guiding system 23 being disposed in the said vertical plane on the other hand to achieve a corresponding large stability for the previously mentioned three-point bearing system. Since the two top pin-and-bush guides 21 and 22 act directly adjacent to the cutting clearance this ensures that the size thereof is maintained constant even for larger cutting forces and a constant cutting quality is thus ensured.

Finally, it should be mentioned that the ram can be either an integral casting or can be a component which is welded together from several individual components. Sectional shapes other than an equal-limbed L-section can be considered, including a ram which is at least partially constructed as a half-shell, depending in first place on a particular application for such a machine.

I claim:

1. A notching machine having a vertically reciprocating ram which is guided by an axial guiding system disposed on a machine frame with the ram carrying at its upper end by means of a projecting tool holder an upper blade assembly cooperating with a lower blade assembly in which there is cutting clearance between the blade assemblies comprising said upper blade assembly forming a forwardly extending apex, said ram forming a rearwardly extending apex at least adjacent said upper blade assembly and at least over an axial length corresponding to the the vertical stroke of said ram, said rearwardly extending apex extending away from said forwardly extending apex for providing substantially maximum notching depth between said apexes, said axial guiding system including first and second pin and guide bushing assemblies disposed between an upper end of said ram and said machine frame, a third pin and guide bushing assembly secured to a bottom end of said ram.

2. A notching machine, more particularly according to claim 1, characterized in that each of said pins is connected to the associated guide bushing through a ball socket joint comprising a joint ball disposed on the pin end or near said pin end and a ball socket which is axially slidable in the guide bushing and is arranged concentrically therewith.

3. A notching machine according to claim 2, characterized in that each ball socket is mounted on a mounting bushing which is axially slidable in the associated guide bushing.

4. A notching machine according to claim 1, characterized in that said first and second pin and guide bushing assemblies are disposed rearwardly with respect to the center of gravity of said blade assembly remote from the forwardly extending apex.

5. A notching machine according to claim 1 characterized in that said first and second pin and guide bushing assemblies are arranged on different sides of the vertical plane which incorporates the measuring distance that defines the punching depth.

6. A notching machine according to claim 1, characterized in that said third pin and guide bushing assembly is disposed in the same vertical plane as the measuring distance which defines the punching depth.

7. The notching machine of claim 1 in which said ram is formed as an angle section with two substantially equal sides the inner surfaces of which forms said rearwardly extending apex.

8. The notching machine of claim 7 in which a collector section is formed within said inner surfaces of said sides and adjacent said upper blade assembly mounting place to provide cutting clearance thereby to provide space for deflection of punching waste.

* * * * *